Oct. 17, 1961     E. J. TABOR     3,005,005
METHOD FOR THE MANUFACTURE OF O-LOWER ALKYL
PHOSPHORODICHLORIDOTHIOATES
Filed Oct. 6, 1958
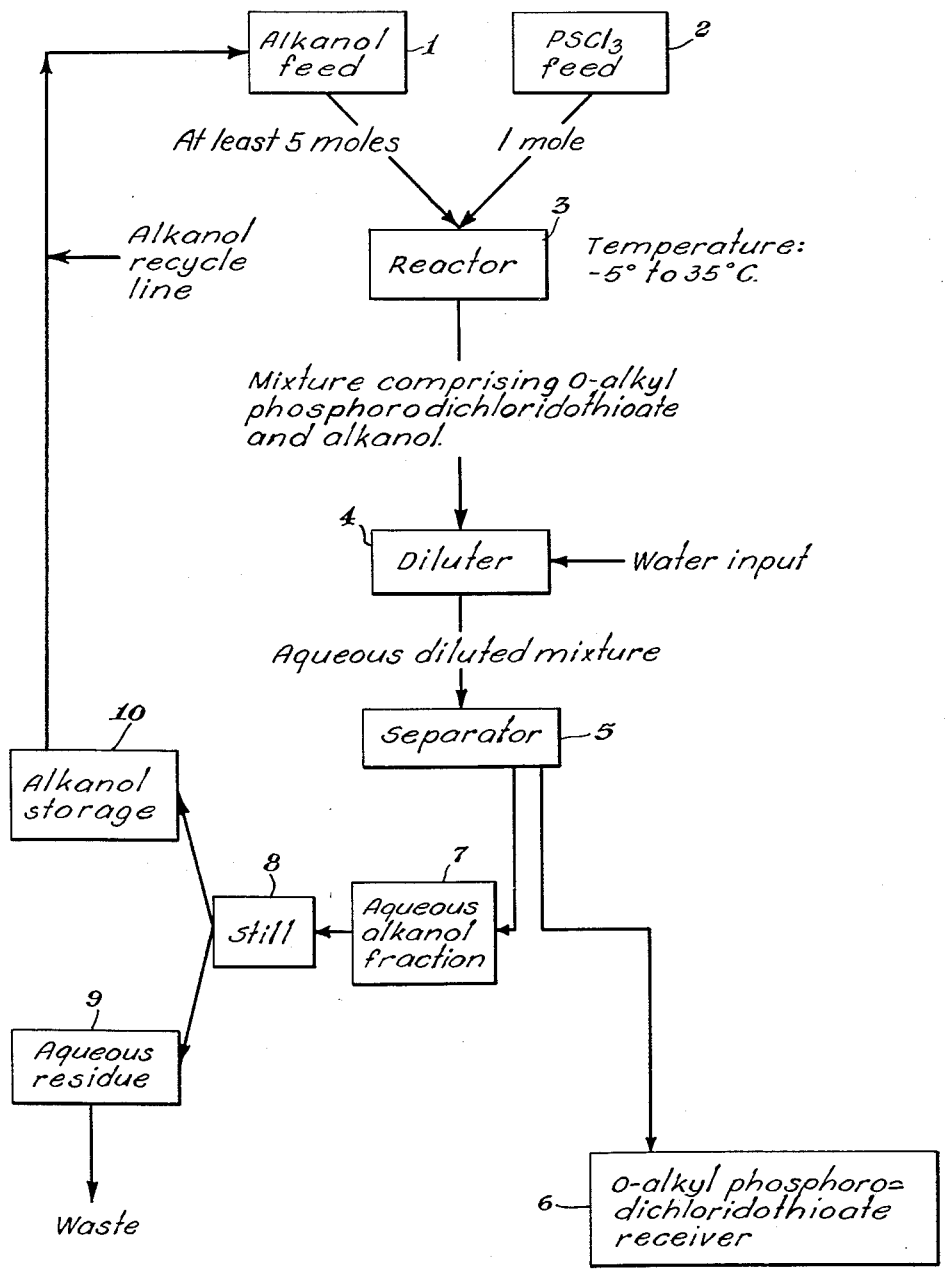
INVENTOR.
*Edward J. Tabor*
BY
*Griswold & Burdick*
ATTORNEYS 3,005,005
METHOD FOR THE MANUFACTURE OF O-LOWER ALKYL PHOSPHORODICHLORIDOTHIOATES
Edward J. Tabor, Midland, Mich., assignor to The Dow Chemical Company, Midland, Mich., a corporation of Delaware
Filed Oct. 6, 1958, Ser. No. 765,520
5 Claims. (Cl. 260—461)

This invention relates to a new and improved method for the manufacture of O-loweralkyl phosphorodichloridothioates having the formula

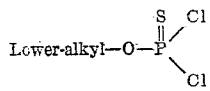

In the present specification and claims, the expression lower alkyl refers to the alkyl radicals containing from 1 to 3 carbon atoms, inclusive. These compounds are liquid materials which are somewhat soluble in many organic solvents and of very low solubility in water. They are valuable as intermediates for the preparation of a variety of more complex phosphorus derivatives such as O-aryl O-lower alkyl phosphorochloridothioates, the O-aryl O-lower alkyl phosphoroamidothioates and the O-aryl, O,O-dialkyl phosphorothioates. In such use, the O-alkyl phosphorodichloridothioate intermediate is reacted with an alkali metal alcoholate to replace one chlorine atom and then with an alkali metal phenolate to replace the second chlorine atom or is reacted successively with an alkali metal phenolate and with ammonia or an amine to replace both chlorine atoms. The resulting compounds are useful as preservatives for paper, paint and wood and as parasiticides for the control of bacteria, fungi, mites and insects such as aphids, southern army worms and flies.

The preparation of O-lower alkyl phosphorodichloridothioates by heating together substantially equimolecular proportions of phosphorus thiochloride and a lower alkanol has been known for many years. However, the reaction as heretofore conducted has resulted in low yields of the desired phosphorodichloridothioates as is disclosed in United States Patent No. 2,575,225.

It is an object of the present invention to provide a new and improved method for the production of O-lower alkyl phosphorodichloridothioates. It is a further object to provide a method which is more economical than known methods and gives increased yields of the O-lower alkyl phosphorodichloridothioates. An additional object is the provision of a method which gives the O-lower alkyl phosphorodichloridothioates in a very short reaction period and in a purity which has not been obtainable by known methods. Another object is the provision of a continuous method for the manufacture of O-lower alkyl phosphorodichloridothioates. Other objects will become apparent from the following specification and claims.

The new and improved process comprises reacting as sole reagents one molecular proportion of phosphorus thiochloride with at least five molecular proportions of a lower alkanol at a temperature at which hydrogen chloride of reaction is formed. The reaction is somewhat exothermic and takes place smoothly at temperatures not in excess of 35° C. Upon completion of the reaction, the reaction mixture is diluted with water and the desired O-lower alkyl phosphorodichloridothioate thereafter withdrawn or siphoned from the aqueous phase, or separated by decantation of the aqueous phase. The separated phosphorodichloridothioate may thereafter be dried by conventional methods such as vacuum distillation or drying over solid drying agents. This new process gives the O-lower alkyl phosphorodichloridothioates in excellent purity and yield and in a very short reaction period. In addition, the new process is more economical than known processes and may be employed as a continuous process for the manufacture of the O-lower alkyl phosphorodichloridothioates. Further, when operating in accordance with the described conditions, the process results in the substitution of one of the chlorine atoms in the phosphorus thiochlorides with a lower alkoxy group and the production of hydrogen chloride.

The proportion of at least five moles of lower alkanol per mole of phosphorus thiochloride is essential for obtaining the improved yields of the O-lower alkyl phosphorodichloridothioates. A large excess of lower alkanol may be employed but is undesirable from the standpoint of economy. In a preferred method of operation, one molecular proportion of phosphorus thiochloride is reacted with from 6 to 10 molecular proportions of lower alkanol.

The phosphorus thiochloride and lower alkanol are contacted at a temperature at which hydrogen chloride of reaction is formed. The formation of hydrogen chloride and reaction between the phosphorus thiochloride and lower alkanol takes place smoothly at temperatures of from —5° to 35° C. In a preferred mode of operation, the reaction is carried out at a temperature of from 5° to 30° C. Temperatures significantly in excess of the maximum temperature as above described materially affect the course of the reaction and should not be employed for any appreciable period of time if it is desired to obtain the O-lower alkyl phosphorodichloridothioate in good purity and high yield.

The rate at which the reaction takes place varies directly with the temperature employed and the concentration of lower alkanol in the range of from five to ten moles of alkanol per mole of phosphorus thiochloride. Thus, the longer contacting periods are employed at the lower temperatures and the lower concentrations of alkanol. The reaction is usually carried out over a period of from 15 to 60 minutes, the formation of hydrogen chloride and the reaction being substantially complete in such a period.

In carrying out the process of the present invention, the required amounts of the reagents may be mixed together under atmospheric pressure conditions and maintained for a short period of time under the aforedescribed temperature conditions. When the formation of hydrogen chloride is substantially complete, the reaction mixture is diluted with water. The dilution is preferably carried out with cold water and under conditions such that when operating at the higher reaction temperatures, the reaction mixture is quenched to a temperature of 10° C. or less. Such preferred procedure gives the desired products in maximum purity and yield. The diluted mixture is thereafter treated as previously described to separate the O-lower alkyl phosphorodichloridothioate. O-methyl phosphorodichloridothioate boils at 48° C. at 15 millimeters' pressure, O-ethyl phosphorodichloridothioate boils at 67° C. at 20 millimeters' pressure, O-propyl phosphorodichloridothioate boils at 84° C. at 20 millimeters' pressure and O-isopropyl phosphorodichloridothioate boils at 59° C. at 10 millimeters' pressure.

A particularly valuable mode of operation comprises carrying out the foregoing preparation as a continuous process. Thus the reactants may be introduced or metered together into a reaction zone, the introduction being carried out at a temperature of from —5° to 35° C. and in the mole ratio of one mole of phosphorus thiochloride with at least five moles of lower alkanol. During the metering and course of the reaction, a product comprising an O-lower alkyl phosphorodichloridothioate and a lower alkanol is continuously withdrawn and diluted with cold water. The O-lower alkyl phosphorodichloridothioate is thereafter withdrawn or siphoned from the aqueous-alkanol phase of the diluted mixture or the aqueous-alkanol phase decanted to obtain the phosphorodichloridothioate as a liquid residue. The aqueous-alkanol phase may be fractionally distilled under reduced pressure to recover the alkanol and the alkanol subsequently recycled or reintroduced with the phosphorus thiochloride.

The continuous process is additionally schematically illustrated in the manner of a flow sheet diagram which is self-explanatory. In the sole figure of the accompanying drawing, the alkanol feed is withdrawn from a supply 1 and introduced into a reactor 3 together with the phosphorus thiochloride feed from a supply 2. During the course of the reaction, the reaction mixture advances through the reactor 3 or zone of controlled temperature and a product comprising the O-lower alkyl phosphorodichloridothioate and lower alkanol withdrawn or discharged into a diluter 4 where it is diluted with water. The O-lower alkyl phosphorodichloridothioate is separated by the separator 5 by withdrawing or siphoning the phosphorodichloridothioate from the aqueous-alkanol phase into the phosphorodichloridothioate receiver 6 or by decanting the aqueous-alkanol phase and introducing the residue into the phosphorodichloridothioate receiver. The separated aqueous-alkanol fraction 7 is then introduced into a still 8 where the alkanol is separated by distillation and subsequently introduced into the alkanol storage 10 from which it may be withdrawn to the alkanol feed 1.

The following examples illustrate the invention and are not to be construed as limiting.

Example 1

In several operations, phosphorus thiochloride and methanol are continuously introduced and metered together into a reaction zone, the introduction being carried out at a temperature of from 10° to 16° C. and in the mole ratio of one mole of phosphorus thiochloride with ten moles of methanol. At various intervals, subsequent to the introduction, a product comprising O-methyl phosphorodichloridothioate and methanol is continuously withdrawn from the reaction zone and quenched in a water bath at about 5° C. The aqueous phase is thereafter decanted from the diluted product to obtain the O-methyl phosphorodichloridothioate as a liquid residue. The intervals subsequent to the introduction at which the products comprising the phosphorodichloridothioate and methanol are continuously withdrawn, together with the yields of O-methyl phosphorodichloridothioate based upon the phosphorus thiochloride starting material are set forth in the following table.

| Operation | Interval of Time Subsequent to the Introduction at which the Product Comprising the Phosphorodichloridothioate and Methanol were withdrawn | Percent Yield |
| --- | --- | --- |
| | Minutes | |
| 1 | 1 | 45 |
| 2 | 1.75 | 52 |
| 3 | 2 | 70 |
| 4 | 4 | 78 |
| 5 | 6 | 82 |
| 6 | 8 | 86 |
| 7 | 15 | 90 |

Example 2

In several similar operations, phosphorus thiochloride and methanol are continuously introduced together into a reaction zone, the introduction being carried out at a temperature of from 10° to 16° C. and in the mole ratio of one mole of phosphorus thiochloride with five moles of methanol. At various intervals subsequent to the introduction, a product comprising an O-methyl phosphorodichloridothioate and methanol is continuously withdrawn from the reaction zone and quenched in water at about 5° C. The aqueous phase is thereafter decanted from the diluted product to obtain the O-methyl phosphorodichloridothioate as a liquid residue. The results obtained in the several operations are set forth in the following table.

| Operation | Interval of Time Subsequent to the Introduction at which the Product Comprising the Phosphorodichloridothioate and Methanol were withdrawn | Percent Yield |
| --- | --- | --- |
| A | 1 Minute | 45 |
| B | 3 Minutes | 61 |
| C | 6 Minutes | 72 |
| D | 10 Minutes | 80 |
| E | 15 Minutes | 84 |
| F | 1 Hour | 90 |

Example 3

Phosphorus thiochloride and ethanol are continuously introduced together into a reaction zone, the introduction being carried out at a temperature of from 5° to 10° C. and in a mole ratio of one mole of phosphorus thiochloride with ten moles of ethanol. One hour subsequent to the introduction, a product comprising an O-ethyl phosphorodichloridothioate and ethanol is continuously withdrawn from the reaction zone and quenched in a water bath at about 5° C. The aqueous phase is thereafter decanted from the diluted product to obtain the O-ethyl phosphorodichloridothioate as a liquid residue. This product is obtained in a yield of 90 percent based upon the phosphorus thiochloride starting material.

Example 4

Phosphorus thiochloride and methanol are continuously metered together in a reaction zone, the metering being carried out at a temperature of from 10° to 16° C. and in the mole ratio of one mole of phosphorus thiochloride with ten moles of methanol. Fifteen minutes subsequent to the metering, a product comprising O-methyl phosphorodichloridothioate and lower alkanol is continuously withdrawn from the reaction zone and quenched in a water bath at about 5° C. The aqueous phase is thereafter decanted from the diluted product to obtain the O-methyl phosphorodichloridothioate in a yield of 90 percent based upon the phosphorus thiochloride starting material.

Example 5

One mole of phosphorus thiochloride is reacted with 10 moles of methanol at a temperature of from 10° to 16° C. In such operations, the reagents are slowly added portionwise with stirring, one to the other, in the mole ratio of one mole of phosphorus thiochloride with ten moles of methanol. The addition is carried over a period of 15 minutes. Following the addition, the reaction mixture is maintained for an additional 15 minutes at about 12° C. and thereafter diluted with cold water. The aqueous phase is thereafter separated by decantation to obtain the O-methyl phosphorodichloridothioate as a residue in a yield of 85 percent based upon the phosphorus thiochloride starting material.

Example 6

In several operations, phosphorus thiochloride and ethanol are continuously introduced into a reaction zone, the introduction being carried out at a temperature of from 25° to 30° C. and in the mole ratio of one mole of phosphorus thiochloride with ten moles of ethanol. Subsequent to the introduction, a product comprising O-ethyl phosphorodichloridothioate and ethanol is continuously withdrawn from the reaction zone and quenched in a water bath at 10° C. The aqueous phase is thereafter decanted from the dilute product to obtain the O-ethyl phosphorodichloridothioate as a liquid residue. The intervals subsequent to the introduction at which the products comprising the phosphorodichloridothioate and ethanol are continuously withdrawn, together with the yields of O-ethyl phosphorodichloridothioate based upon the phosphorus thiochloride starting material are set forth in the following table.

| Operation | Interval of Time Subsequent to the Introduction at which the Product Comprising the Phosphorodichloridothioate and Ethanol were withdrawn | Percent Yield |
|---|---|---|
| | Minutes | |
| 1 | 2 | 53 |
| 2 | 4 | 69 |
| 3 | 6 | 78 |
| 4 | 8 | 81 |
| 5 | 10 | 86 |
| 6 | 15 | 90 |

I claim:

1. A method for the production of an O-lower alkyl phosphorodichloridothioate which comprises reacting as the essentially sole reagents one molecular proportion of phosphorus thiochloride with at least five molecular proportions of a lower alkanol at a temperature at which no more than one molecular proportion of hydrogen chloride is formed as a product of reaction, said temperature being not in excess of 35° C.

2. A method for the production of an O-lower alkyl phosphorodichloridothioate which comprises the steps of (a) introducing together into a reaction zone as the essentially sole reagents phosphorus thiochloride and a lower alkanol at a temperature of from −5° to 35° C. and in the mole ratio of one mole of phosphorus thiochloride with at least 5 moles of lower alkanol, (b) withdrawing from the reaction zone a product comprising an O-lower alkyl phosphorodichloridothioate and a lower alkanol, (c) diluting said product with cold water, and (d) separating said O-lower alkyl phosphorodichloridothioate from the diluted product.

3. A method for the production of an O-lower alkyl phosphorodichloridothioate which comprises reacting as the essentially sole reagents one molecular proportion of phosphorus thiochloride with at least five molecular proportions of a lower alkanol at a temperature of from −5° to 35° C.

4. A method for the production of O-methyl phosphorodichloridothioate which comprises the steps of (a) introducing together into a reaction zone as the essentially sole reagents phosphorus thiochloride and methanol at a temperature of from 5° to 30° C. and in the mole ratio of one mole of phosphorus thiochloride with at least 5 moles of lower alkanol, (b) withdrawing from the reaction mixture a product comprising O-methyl phosphorodichloridothioate and methanol, (c) diluting said product with cold water, and (d) separating said O-methyl phosphorodichloridothioate from the diluted product.

5. A method for the production of O-ethyl phosphorodichloridothioate which comprises the steps of (a) introducing together into a reaction zone as the essentially sole reagents phosphorus thiochloride and ethanol at a temperature of from 5° to 30° C. and in the mole ratio of one mole of phosphorus thiochloride with at least five moles of alkanol, (b) withdrawing from the reaction mixture a product comprising O-ethyl phosphorodichloridothioate and ethanol, (c) diluting acid product with cold water, and (d) separating said O-ethyl phosphorodichloridothioate from the diluted mixture.

References Cited in the file of this patent

UNITED STATES PATENTS

| 1,869,768 | Nicolai et al. | Aug. 2, 1932 |
| 1,945,183 | Clemmensen | Jan. 30, 1934 |
| 2,575,225 | Manske et al. | Nov. 13, 1951 |

OTHER REFERENCES

Booth et al.: J. Am. Chem. Soc. 70, 2523–2525 (1948).